(12) United States Patent
Hirabayashi

(10) Patent No.: US 6,535,172 B2
(45) Date of Patent: Mar. 18, 2003

(54) ANTENNA DEVICE AND RADIO COMMUNICATION CARD MODULE HAVING ANTENNA DEVICE

(75) Inventor: Takayuki Hirabayashi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/955,340

(22) Filed: Sep. 18, 2001

(65) Prior Publication Data

US 2002/0033773 A1 Mar. 21, 2002

(30) Foreign Application Priority Data

Sep. 19, 2000 (JP) ........................................ 2000-284127

(51) Int. Cl.$^7$ ............................ H01Q 21/00; H01Q 1/38
(52) U.S. Cl. ................................ 343/725; 343/700 MS; 343/702
(58) Field of Search .................... 343/700 MS, 702, 343/725, 795, 806, 846, 848; 455/90

(56) References Cited

U.S. PATENT DOCUMENTS 6,172,645 B1 * 1/2001 Hollander et al. ... 343/700 MS
6,204,819 B1 * 3/2001 Hayes et al. ......... 343/700 MS
6,281,850 B1 * 8/2001 Klostermann ........ 343/700 MS
6,388,625 B1 * 5/2002 Fukushima et al. ......... 343/702
6,404,394 B1 * 6/2002 Hill ..................... 343/700 MS
6,408,190 B1 * 6/2002 Ying .......................... 343/702

* cited by examiner

Primary Examiner—Tan Ho
(74) Attorney, Agent, or Firm—Frommer Lawrence & Haug LLP; William S. Frommer; Darren M. Simon

(57) ABSTRACT

Realizing a small-sized antenna device whose protruding length from a main apparatus is made minimum when installed and adding radio communication function thereto and has polarization diversity characteristics. A module main body 5 has a circuit board 22 built therein, an antenna device 1, and a connection terminal 23, and adds radio communication function to a main apparatus 2 when inserted to a slot 3 thereof. The antenna device 1 is mounted to the module main body 5 on a second side 5b located on the opposite.side of a first side 5a which has formed thereon the connection terminal 23. The antenna substrate 8 which has at least an inversed F type antenna pattern and a meander type antenna pattern formed on the main surface 8a thereof by printed wiring is supported perpendicular to the insertion direction toward the main apparatus 2.

14 Claims, 7 Drawing Sheets

ANTENNA DEVICE AND RADIO COMMUNICATION CARD MODULE HAVING ANTENNA DEVICE

BACKGROUND OF THE INVENTION

1. Field of the Invention

The present invention relates to a card-shaped radio communication module which is installed to electrical apparatuses such as a personal computer, a wireless telephone, and an audio apparatus, and adds radio communication function there to, and an antenna device which is comfortably used in the card-shaped radio communication module.

2. Description of the Related Art

Recently, along with digitization of data, information such as music, speech, images and other various data can be obtained easily from a personal computer or mobile computer. Furthermore, such information is band-compressed by undergoing the speech codec technique or image codec technique, and is delivered to a variety of radio communication terminal equipment easily and efficiently by digital radio communication or digital radio broadcasting. For example, audio video data (AV data) can also be received by a wireless telephone.

On the other hand, systems for transmitting/receiving data are being utilized in household as well as various environments by the use of simplified radio communication network systems which can be employed even in a region of a small scale. As the radio communication network systems, radio communication systems for next generation such as the 5 GHz narrow-band radio communication system proposed in IEEE 802.1a, 2.45 GHz band radio LAN system proposed in IEEE 802.1b, and a short-range radio communication system termed Bluetooth are worthy of notice.

There has been proposed a personal computer system in which a card-sized radio LAN card 50 adds radio communication function to a personal computer 2 or a main apparatus 2. The main apparatus 2 can transmit/receive data among apparatuses constituting the system when the radio LAN card 50 is installed to a slot 3 thereof, as shown in FIG. 1. The radio LAN card 50 has a module main body 51 and an antenna unit 52 provided at one side thereof. The radio LAN card 50 has a radio communication controlling unit and a high frequency signal processing unit built therein. The radio LAN card 50 is electrically connected to the main apparatus 2 when the module main body 51 is installed to the slot 3 thereof. At this time, the antenna unit 52 is exposed to the outside to transmit/receive data among the apparatuses, as shown in FIG. 2.

In the radio LAN system proposed in IEEE 802.1b, a radio LAN card conforming to the PCMCIA (Personal Computer Memory Card International Association) is widely utilized. On the other hand, in the Bluetooth radio communication network system, a small-sized radio LAN card having radio communication function has been developed.

When the radio LAN card 50 conforming to the PCMCIA is installed to the slot 3 of the main apparatus 2, the antenna unit 52 protrudes from the side of the main apparatus 2 by a length 1 being approximately 25 mm, as shown in FIG. 2. Furthermore, an external antenna, not shown, is mounted to the antenna unit 52 so as not to be prevented from transmitting/receiving data among the apparatuses by the main apparatus 2, which undesirably makes the main apparatus 2 complicated and enlarged.

In case the main apparatus 2 is a portable apparatus such as a note type personal computer or mobile apparatus, the protruding length of the radio LAN card 50 is too large and cumbersome. So, the radio LAN card 50 is often broken when hit by the user by mistake. Furthermore, even though the radio LAN card 50 can add radio communication function to various apparatuses, the configuration shape is restricted, which undesirably raise the difficulty in designing with high degree of freedom.

There are proposed antenna apparatuses of variety of configurations, and an inversed F type antenna is used as a built-in antenna of a relatively simplified configuration. The inversed F type antenna has an antenna pattern, a short circuit forming pattern, and a feeding pattern. The short circuit forming pattern has an end thereof connected to an end of the antenna pattern perpendicular thereto, and the feeding pattern has an end thereof connected to the halfway portion of the antenna pattern in parallel with the short circuit forming pattern. Thus, the inversed F type antenna of an inversed F shape is configured. The direction of the main polarized wave of the inversed F type antenna crosses perpendicular to the antenna pattern thereof.

FIG. 3 shown a schematic view of an antenna device 60 in which a pair of inversed F type antenna patterns being a first inversed F type antenna pattern 62 and a second inversed F type antenna pattern 63 are formed perpendicular to each other. The direction of the main polarized wave of the first inversed F type antenna pattern 62 is a1 and that of the second inversed F type antenna pattern 63 is b1, thereby configuring polarization diversity. Thus configured antenna-device 60 requires a height h, which makes it difficult to reduce the size thereof. So, in case the antenna device 60 is used as the antenna unit 52, the radio LAN card 50 is undesirably enlarged.

The radio communication function is added to various apparatuses such as a digital still camera, a video camera or a portable audio apparatus as an AV apparatus, a household electrical apparatus, and an entertainment robot, as well as a radio communication apparatus and an apparatus in a computer system. Especially, with a portable apparatus, forming a plurality of communication ports or installing hardware conforming to various standards induce enlargement and high price of the apparatus, which significantly prevents the diffusion thereof. Furthermore, the radio communication function is significantly affected by interference generated at the same frequency band or at different frequency bands.

Since the radio LAN card is used in above-described various apparatuses as well as a radio communication apparatus and an apparatus in a computer system, a small-sized antenna device which does not protrude so much from a main apparatus and has polarization diversity characteristics is required extremely.

OBJECT AND SUMMARY OF THE INVENTION

It is therefore an object of the present invention to overcome the above-mentioned drawbacks by providing a small-sized antenna device which has polarization diversity characteristics.

It is another object of the present invention to provide a radio communication card module which has a small-sized antenna unit whose protruding length from a main apparatus is made minimum when installed and adding radio communication function thereto and has polarization diversity characteristics.

According to the present invention, there is provided an antenna device which has at least a first antenna pattern being an inversed F type antenna pattern and a second antenna pattern being a meander type antenna pattern formed on the main surface of a dielectric substrate by printed wiring. The inversed F type antenna pattern and the meander type antenna pattern are wired so that the directions of the main polarized wave of these antenna patterns cross perpendicular to each other. There is formed a short circuit forming pattern on the dielectric substrate between the inversed F type antenna pattern and the meander type antenna pattern. There is formed a ground pattern on the dielectric substrate in the vicinity of a feeding portion of the meander type antenna pattern. The meander type antenna pattern has a point in the vicinity of the opened end thereof connected to a circuit unit formed on the dielectric substrate or to a short circuit forming pattern formed on the dielectric substrate between the inversed F type antenna pattern and the meander type antenna pattern.

With the antenna device according to the present invention, having the inversed F type antenna pattern and the meander type antenna pattern whose directions of the main polarized wave cross perpendicular to each other, the antenna device can be reduced in size and configure polarization diversity, and whose antenna characteristics is not deteriorated when affected by the housing shape of a main apparatus or material thereof when installed to the main apparatus, which can realize transmission/reception of data or information with high accuracy. Furthermore, with the antenna device, the short circuit forming pattern can prevent the inversed F type antenna pattern and the meander type antenna pattern from affecting each other. Furthermore, with the antenna device, by forming a ground pattern and a circuit unit in the vicinity of the meander type antenna pattern, shunt capacitance is add to reduce the resonance frequency, while realizing impedance matching of the meander type antenna pattern.

According to the present invention, there is also provided a radio communication card module which has a module main body having a radio communication controlling unit and a high frequency signal processing unit built therein, an antenna unit, and a connector unit. The antenna unit is mounted to a second side located on the opposite side of a first side which has the connector unit, and a dielectric substrate which has at least a first antenna pattern being an inversed F type antenna pattern and a second antenna pattern being a meander type antenna pattern formed on the main surface of the dielectric substrate by printed wiring is supported perpendicular to the insertion direction toward a main apparatus.

The radio communication card module is installed to a slot of the main apparatus and the connector unit is connected to a connector unit of the main apparatus, and adds radio communication function to the main apparatus. When the module main body is inserted to the main apparatus and supported therein, the antenna unit protrudes from the side of the main apparatus by a length being the thickness thereof along the side direction of the main apparatus. With the radio communication card module according to the present invention, the protruding length of the antenna unit from the main apparatus can be made minimum. Furthermore, with the radio communication card module, having the inversed F type antenna pattern and the meander type antenna pattern whose directions of the main polarized wave cross perpendicular to each other, the radio communication card module can be reduced in size and configure polarization diversity, and whose antenna characteristics is not deteriorated when affected by the housing shape of a main apparatus or material thereof when installed to the main apparatus, which can realize transmission/reception of data or information with high accuracy.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 9A and FIG. 9B show the measurement result of the voltage standing wave ratio (VSWR) of the impedance matching characteristics, of which FIG. 9A shows the result of the inversed F type antenna pattern, while FIG. 9B shows that of the meander type antenna pattern.

DETAILED DESCRIPTION OF THE PREFERRED EMBODIMENTS

Preferred embodiments according to the present invention will further be a described below with reference to the accompanying drawings.

Figure 1:
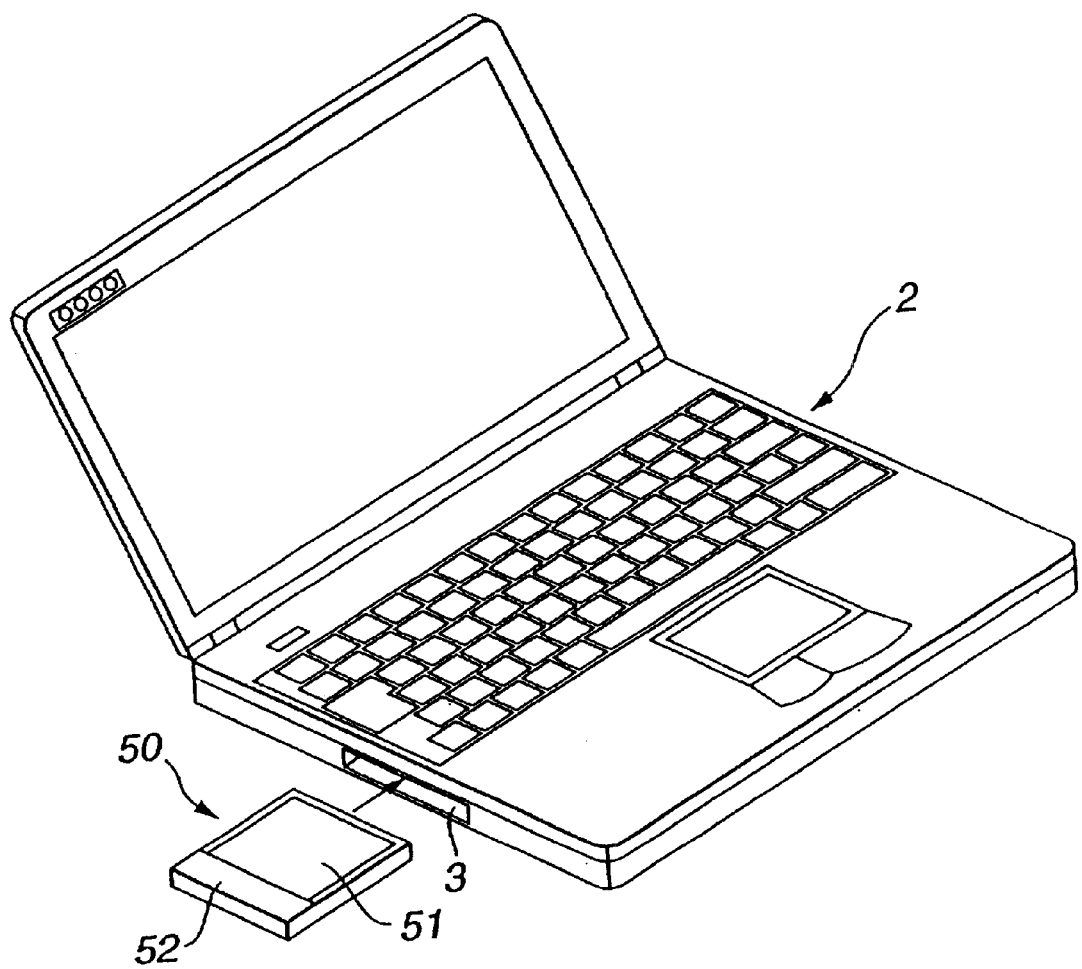
FIG. 1 shows a perspective view of a state in which a conventional radio communication card module is inserted to a personal computer.
Figure 2:
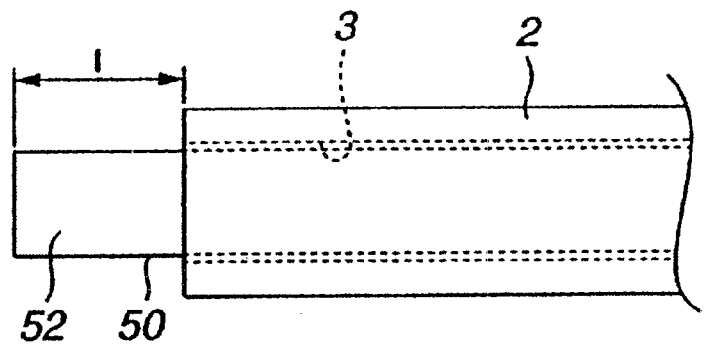
FIG. 2 shows a side view of a state in which the conventional radio communication card module is inserted to the personal computer.
Figure 3:
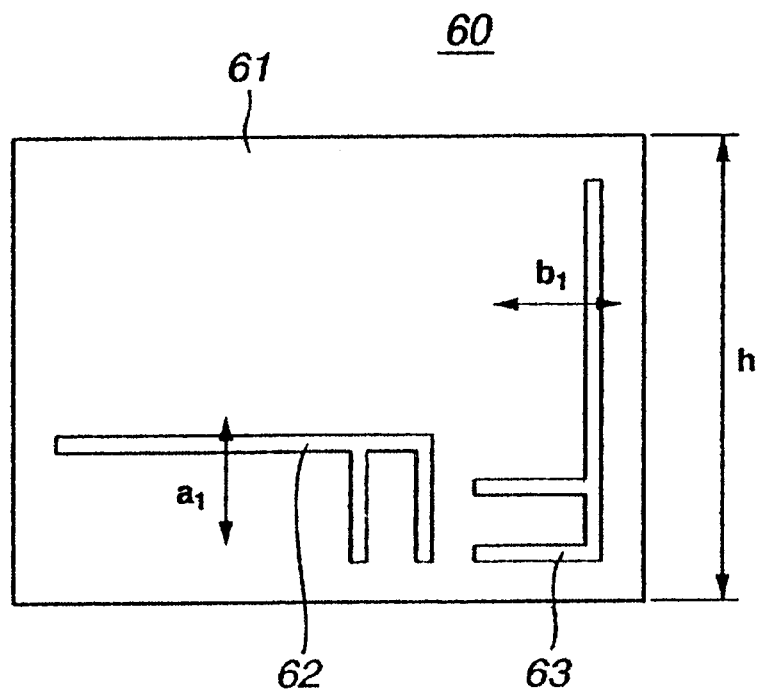
FIG. 3 shows a front view of a conventional antenna device.
Figure 4:
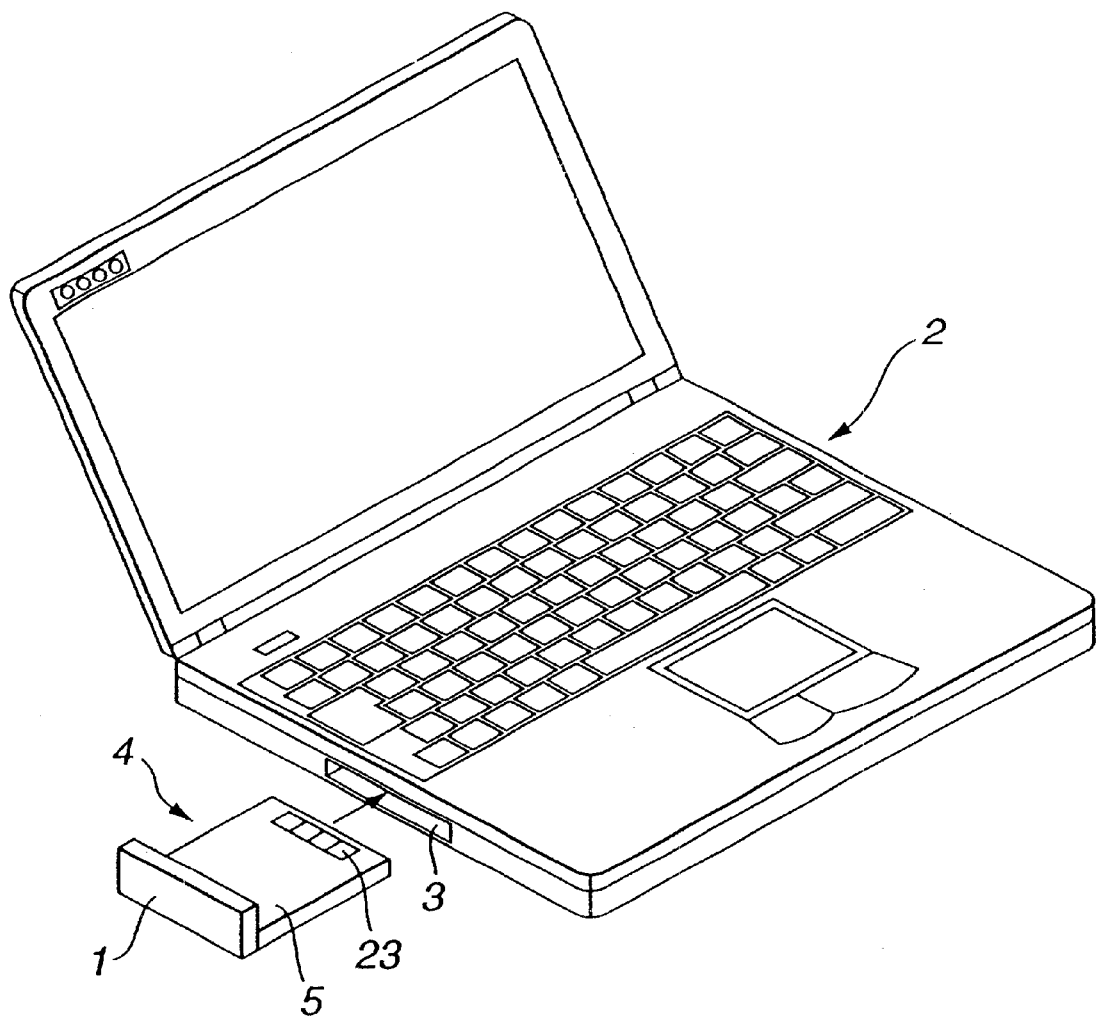
FIG. 4 shows a perspective view of a state in which a radio communication card module according to the present invention is inserted to a personal computer being a main apparatus.
Figure 5:
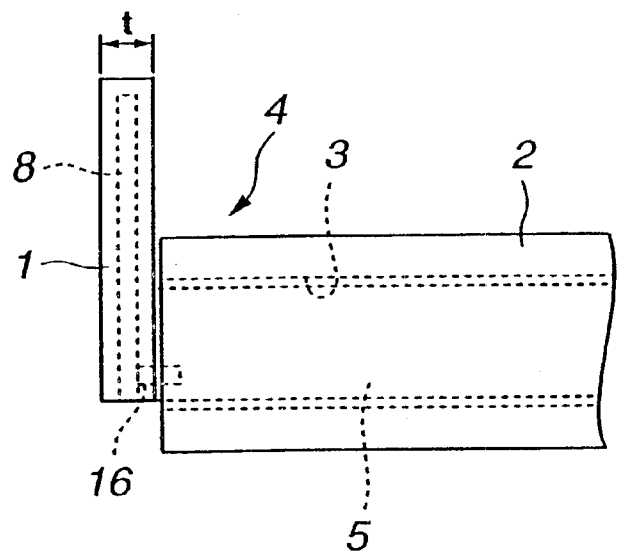
FIG. 5 shows a side view of a state in which the radio communication card module according to the present invention is inserted to the personal computer.
Figure 6:
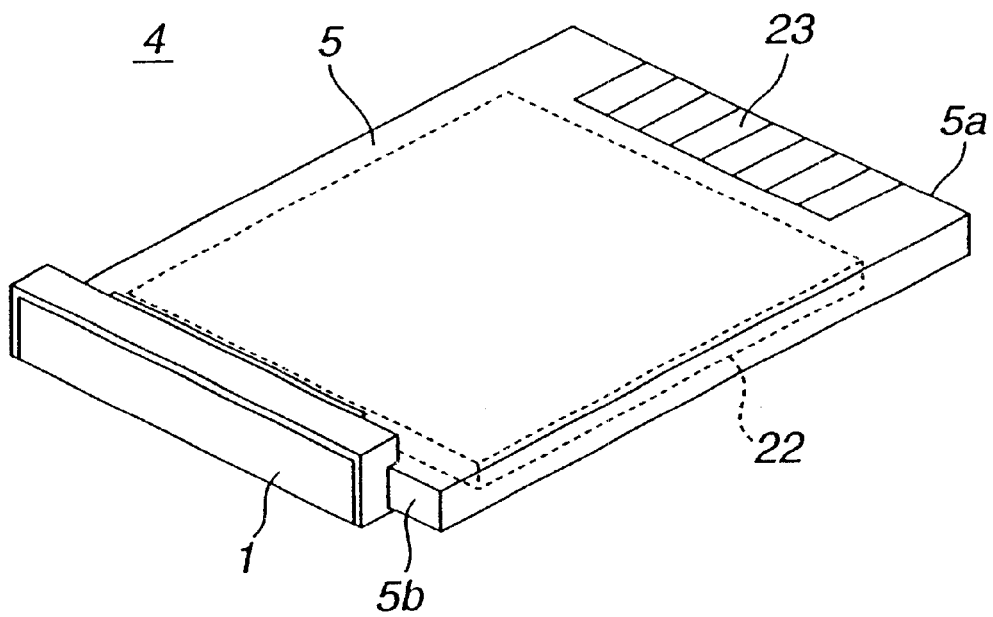
FIG. 6 shows a perspective view of the radio communication card module according to the present invention.

An antenna device 1 according to the present invention is removably mounted to a radio communication card module 4 which adds radio communication function to a personal computer 2 or a main apparatus 2 when installed thereto. The radio communication card module 4 adds radio communication function to the main apparatus 2 when installed to a slot 3 thereof, as shown in FIGS. 4 and 5. The radio communication card-module 4 is removed when it is not necessary.

The radio communication card module 4 adds radio communication function to the main apparatus 2 so that the main apparatus 2 can transmit/receive data among apparatuses constituting a radio communication network system by radio communication. The radio communication card module 4 receives data or information from apparatuses via the internet and transmits the received data or information to the main apparatus 2 or to apparatuses included in the internet. Having the antenna device 1 of high performance mounted thereto, the radio communication card module 4 can transmit/receive radio information with high accuracy. The radio communication card module 4 has the protruding length of the antenna device 1 from the main apparatus 2 made minimum. So, the antenna device 1 is not considered to be cumbersome, and is not broken so often due to a hit by the user.

The radio communication card module 4 has a card-sized module main body 5 and an antenna device 1 provided at one side thereof. The radio communication card module 4 has a first side 5a which is to be installed to the main apparatus 2, and a second side 5b located on the opposite side of the first side 5a to which the antenna device 1 is removably mounted. The module main body 5 has built therein a circuit board 22 which has formed thereon a high frequency signal processing unit, a CPU and a ROM constituting a baseband signal processing unit and a controlling unit, a general purpose LSI, a memory element for performing storage function, and a power supply controlling unit, the details of which is omitted. The main surface of the first side 5a of the module main body 5 has formed thereon a connection terminal 23. The connection terminal 23 may be a plug-shaped terminal conforming to the standard of the radio communication card module 4.

On inserting the first side 5a of the module main body 5 to the slot 3 of the main apparatus 2, the connection terminal 23 is connected to a connection terminal formed inside the slot 3. Thus, radio communication card module 4 is connected to the main apparatus 2. When the radio communication card module 4 is inserted to the main apparatus 2 and supported therein, the antenna device 1 protrudes from the side of the main apparatus 2 by a length t being the thickness thereof along the side direction of the main apparatus, as shown in FIG. 5. The antenna device 1 is so formed as to be reduced in thickness, the details of which will be described later. The protruding length t of the antenna device 1 from the main apparatus 2 is approximately 4 mm, which is about one sixth of the protruding length 1 of the radio LAN card 50 being approximately 25 mm.

Since the antenna device 1 of the radio communication card module 4 is located in the vicinity of the main apparatus 2, the antenna characteristics of the antenna device 1 may be deteriorated when affected by the housing shape of the main apparatus 2 or material thereof. So, the antenna device 1 of the radio communication card module 4 has built therein two antennas, the directions of the main polarized wave of which are different from each other to configure polarization diversity. Thus, the radio communication card module 4 having the antenna device 1 can transmit/receive data or information with high accuracy irrespective of the antenna characteristics. The radio communication card module 4 has the antenna device 1 having these two antennas so formed as to be reduced in size, which can make the antenna device 1 supported with stability by the main apparatus 2.

Figure 7:
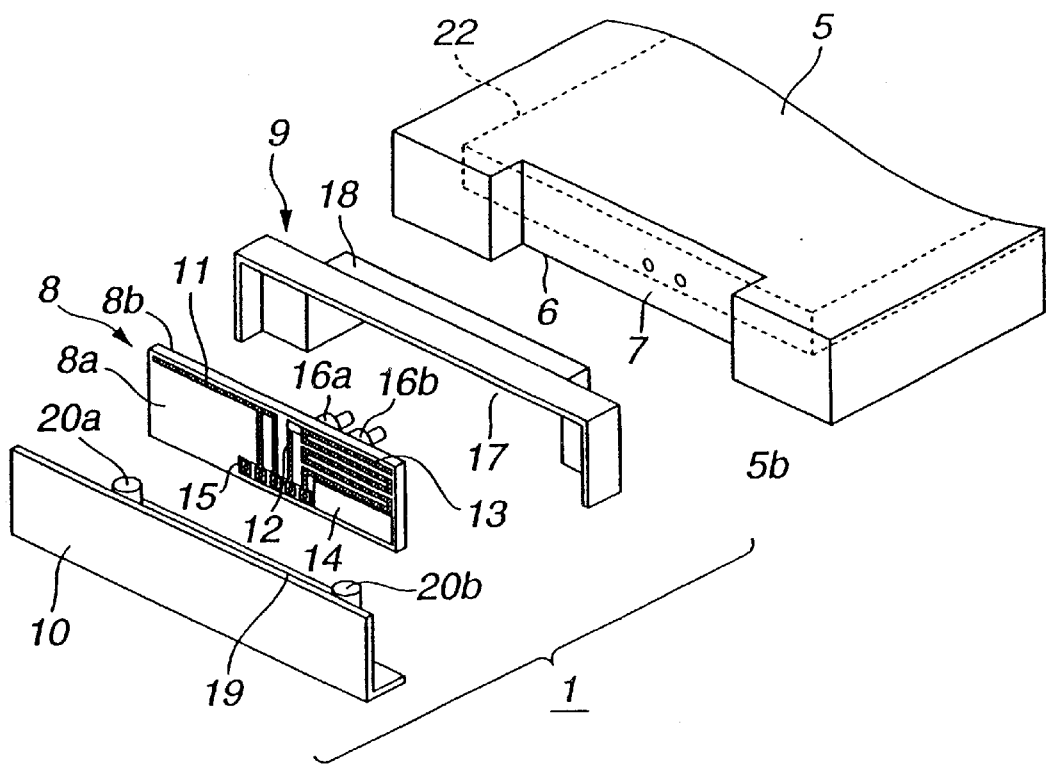
FIG. 7 shows an exploded perspective view of the principal portion of the radio communication card module according to the present invention.

There is formed a recess 6 for supporting the antenna device 1 at the second side 5b of the module main body 5, as shown in FIG. 7. There are formed a pair of coaxial jack terminals 7 adjacent to each other at the recess 6 along the width direction of the module main body 5, the details of which is omitted. The jack terminals 7 are connected to the circuit board 22 built in the module main body 5, and data is transmitted between the antenna device 1 and the module main body 5 via the jack terminals 7. The antenna device 1 is fed with power via the jack terminals.

The antenna device 1 has an antenna substrate 8, a holding member 9 being a housing for holding the antenna substrate 8, a front member 10, and a pair of coaxial plug connectors 16 (16a, 16b). The holding member 9 is of a box-shaped configuration with its front side and bottom side opened. The holding member 9 has formed therein an opening 17 for holding the antenna substrate 8, and a terminal cover 18 is unitedly formed at the rear side thereof. The front member 10 shuts the opened front and bottom sides of the holding member 9, and has a supporting member 19 for supporting the antenna substrate 8 which is unitedly formed at the protruding bottom formed at the rear side thereof. The front member 10 also has a pair of protruding studs 20 (20a, 20b) to be coupled to the holding member 9 which are unitedly formed at both sides of the supporting member 19. The holding member 9 and front member 10 perpendicularly holds the antenna substrate 8.

The main surface 8a of the antenna substrate 8 has formed thereon a first antenna pattern 11, a second antenna pattern 13, and a short circuit forming pattern 12 located therebetween. The other main surface 8b of the antenna substrate 8 has mounted thereto the coaxial plug connectors 16 perpendicularly. The antenna substrate 8 is made of burning resistance glass material of FR4 grade (flame retardant grade) being generally an epoxy resin copper-clad laminate substrate. And the patterns, to be described later, are formed by printing or etching method. The antenna substrate 8 uses an FR 4 copper-clad laminate substrate having a dielectric constant of approximately 4. Also, a polytetrafluoroethylene (Teflon being a trade name)-ceramic combined substrate and a ceramic substrate can also be used as the substrate. The antenna substrate 8 using a substrate having a high dielectric constant reduces the resonance frequency, which can miniaturize the antenna device 1. The antenna substrate 8 can also use the Teflon (trade name), etc. having a high dielectric constant and a low dielectric dissipation factor at a significantly high frequency band more than 10 GHz.

Figure 8:
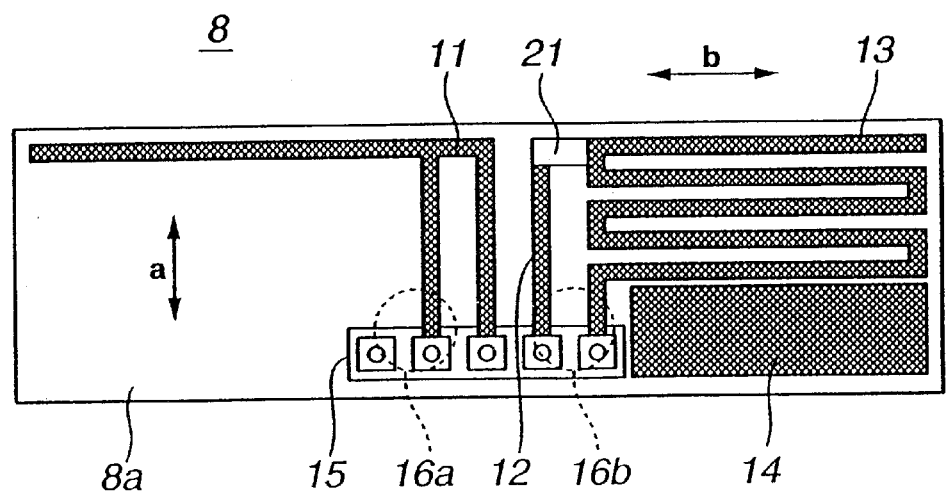
FIG. 8 shows a front view of an antenna device according to the present invention to be mounted to the radio communication card module.

Next, the configuration of the patterns formed on the antenna substrate 8 will be described, in which terms "upside", "downside", "left", "right", etc. are used when FIG. 8 is vied. The antenna substrate 8 is a miniaturized substrate having high performance. The outside dimension of the antenna substrate 8 is 42 mm×9.5 mm×0.8 mm. The first antenna pattern 11 is an inversed F type antenna pattern formed on the left portion of the main surface 8a of the antenna substrate 8. The first antenna pattern 11 or the inversed F type antenna pattern 11 has a resonating pattern, a short circuit forming pattern, and a feeding pattern. The resonating pattern extends directly from a point near the left edge to a point near the center portion along the upside edge on the main surface 8a. The short circuit forming pattern extends downward directly from the center portion end of the resonating pattern perpendicular thereto. The feeding pattern extends downward directly from the halfway portion of the resonating pattern perpendicular thereto in parallel with the short circuit forming pattern. Thus, the inversed F type antenna of an inversed F shape facing the bottom of the antenna substrate 8 is formed. The direction of the main polarized wave of the inversed F type antenna pattern 11 is parallel with upside to downside direction of the main surface 8a of the antenna substrate 8, as shown by an arrow a in FIG. 8.

The short circuit forming pattern 12 is located substantially at the center portion of the main surface 8a of the antenna substrate 8 and extends from upside to downside directly. The short circuit forming pattern 12 is located between the first antenna pattern 11 and the second antenna pattern 13 to electrically insulate these patterns, thereby preventing them from affecting each other. Thus, the short circuit forming pattern 12 allows the first antenna pattern 11 and second antenna pattern 13 to be formed closely with each other, which can miniaturize the antenna substrate 8.

The second antenna pattern 13 is a meander type antenna pattern which is folded alternately to form a zigzag line, and is formed on the left portion of the main surface 8a separated by the short circuit forming pattern 12. The direction of the main polarized wave of the second antenna pattern 13 or the meander type antenna pattern 13 is parallel with left to right direction of the main surface 8a of the antenna substrate 8, as shown by an arrow b in FIG. 8. Thus, the direction of the main polarized wave of the meander type antenna pattern 13 crosses perpendicular to that of the inversed F type antenna pattern 11, thereby configuring polarization diversity. So, the height of the antenna substrate 8 using the meander type antenna pattern 13 is less than half that of the antenna device 60 in which a pair of inversed F type antennas are formed perpendicular to each other to configure polarization diversity.

On the other hand, the antenna substrate 8 may be formed so that the direction of the main polarized wave of the meander type antenna pattern 13 is made equal to that of the inversed F type antenna pattern 11, thereby configuring polarization diversity in which the directions of the main polarized wave of the inversed F type antenna pattern 11 and meander type antenna pattern 13 are equal.

The main surface 8a of the antenna substrate 8 has formed thereon a ground pattern 14 under the meander type antenna pattern 13. The ground pattern 14 is formed in the vicinity of a feeding end of the meander type antenna pattern 13 with a clearance being 0.2 mm therebetween in this embodiment. Thus configured ground pattern 14 adds shunt capacitance to reduce the resonance frequency, which can miniaturize the antenna device 1, while realizing impedance matching of the second antenna pattern 13. The antenna substrate 8 may not have formed thereon the ground pattern 14 for adding the shunt capacitance at a predetermined frequency specification.

The antenna substrate 8 has formed thereon a circuit unit 21 for performing high frequency signal modulation and amplification, which has chips or electronic parts such as coils, capacitors, resistors, short resistors, etc. The circuit unit 21 is connected to a point in the vicinity of the opened end of the meander type antenna pattern 13. The circuit unit 21 reduces the resonance frequency along with the ground pattern 14, which can miniaturize the antenna device 1, while realizing impedance matching of the second antenna pattern 13. Thus, the antenna substrate 8 can form the meander type antenna pattern 13 in a region smaller than that required for performing resonance, which is approximately from $\lambda/2$ to $\lambda/4$ in length.

The antenna substrate 8 may have formed thereon another short circuit forming pattern to directly connect the short circuit forming pattern 12 to a point in the vicinity of the opened end of the second antenna pattern 13 instead of forming the circuit unit 21. With thus configured antenna substrate 8, the impedance matching can also be realized and the resonance frequency can be reduced.

The main surface 8a of the antenna substrate 8 has formed thereon a feeding pattern 15 under the center portion thereof. The feeding pattern 15 has arranged thereon lands to which the ends of the short circuit forming pattern and feeding pattern of the inversed F type antenna pattern 11, feeding end of the short circuit forming pattern 12, and feeding end of the meander type antenna pattern 13 are connected. There are formed mounting holes on the feeding pattern 15 through which the ends of the coaxial plug connectors 16a, 16b are inserted, respectively, the details of which is omitted.

The coaxial plug connectors 16a, 16b have their basal portions inserted through the holes, and connected to the feeding pattern 15 by soldering. Each of the coaxial plug connectors 16a, 16b has an input/output terminal at the core thereof, and has a ground terminal at the outer circumference thereof. The input/output terminal and ground terminal of each of the coaxial plug connectors 16a, 16b are connected to the lands of the feeding pattern 15 by soldering. Thus, each of.the coaxial plug connectors 16a, 16b protrudes perpendicular to the antenna substrate 8.

When the antenna substrate 8 is housed in the holding member 9 and front member 10, the ends of the coaxial plug connectors 16a, 16b protrude from the terminal cover 18 to be exposed to outside. Each of the ends of the coaxial plug connectors. 16a, 16b is configured to be a plug. And when the antenna device 1 is mounted to the module main body 5, each end of the coaxial plug connectors 16a, 16b is fit into each of the jack terminals 7, as will be described hereinafter. Thus, the coaxial plug connectors 16a, 16b being connecting means connect the antenna device 1 to the module main body 5, and transmit/receive data therebetween and feed the antenna device 1 with power.

The antenna device 1 is engaged in the recess 6 of the module main body 5, when the coaxial plug connectors 16a, 16b protruding from the terminal cover 18 are inserted to the jack terminals 7 of the module main body 5. Thus the antenna device 1 is mounted to the module main body 5 to configure the radio communication card module 4. When the antenna device 1 is mounted to the module main body 5, the antenna device 1 uprises at the side of the module main body 5 along the side direction thereof. The antenna device 1 can be detached from the module main body 5 by pulling out the antenna device 1 from the module main body 5. So, the radio communication card module 4 can be handled easily by separating the antenna device 1 and module main body 5 when not in use.

With the radio communication card module 4, it is required that the first and second antenna patterns 11, 13 are not affected by metal portions of the module main body 5. Thus, in the antenna device 1, the resonating pattern of the inversed F type antenna pattern 11 is so formed as to be separated from the metal portions of the module main body 5. On the other hand, in the antenna device 1, the meander type antenna pattern 13 is formed so that the feeding end thereof is located in the vicinity of the metal portions of the module main body 5, while the opened end thereof is separated from the metal portions of the module main body 5. Furthermore, in the antenna device 1, the meander type antenna pattern 13 is so formed as to be coupled to the ground of the module main body 5, which can make it possible to obtain a desired resonance frequency.

With the radio communication card module 4, the first and second antenna patterns 11, 13 are set to be used in the same frequency band. On the other hand, the first and second antenna patterns 11, 13 may be set to be used in different frequency bands. With the radio communication card module 4, the inversed F type antenna pattern 11 whose resonating pattern length can be set large is used for low frequency band, while the meander type antenna pattern 13 being used for high frequency band.

With the radio communication card module 4, it is possible to set the first and second antenna patterns 11, 13 so that either of them can be used in case it is not necessary to configure polarization diversity. With the radio communication card module 4, it is not necessary to form the first and second antenna patterns 11, 13 on the antenna substrate 8 in above-described manner, and, for example, they may be formed in regions having the same area. With the radio communication card module 4, the second antenna pattern 13 may be a chip type antenna pattern.

Figure 9A:
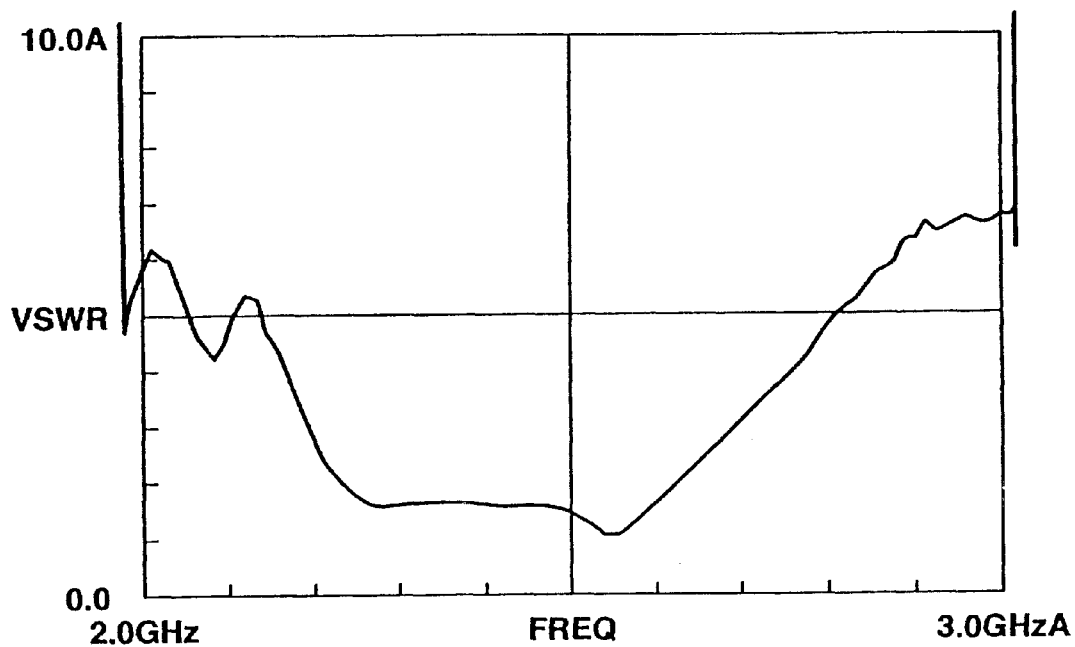
Figure 9B:
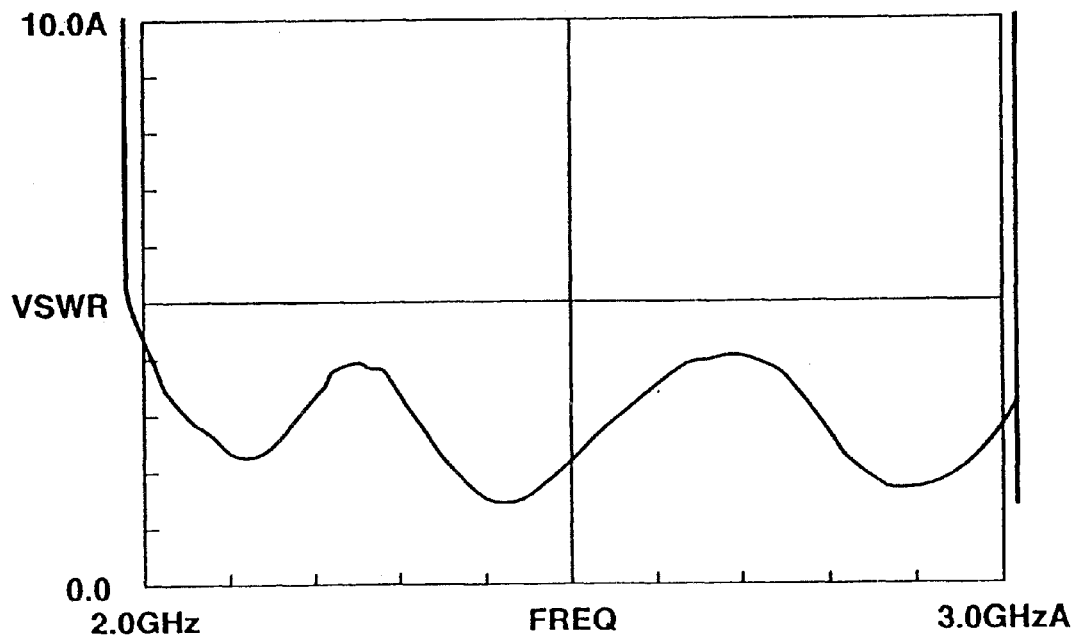

FIG. 9A and FIG. 9B show the measurement result of the voltage standing wave ratio (VSWR) of the impedance matching characteristics. FIG. 9A shows the result of the inversed F type antenna pattern 11, while FIG. 9B shows that of the meander type antenna pattern 13. The antenna device 1 is so designed as to be used for 2.4 GHz to 2.48 GHz band which is the standard band employed by the radio communication card module 4. The smaller the VSWR is, the better the antenna characteristics becomes. As is apparent from FIG. 9A and FIG. 9B, each value of the VSWR of the inversed F type antenna pattern 11 and meander type antenna pattern 13 is desirably both less than 2.

Figure 10:
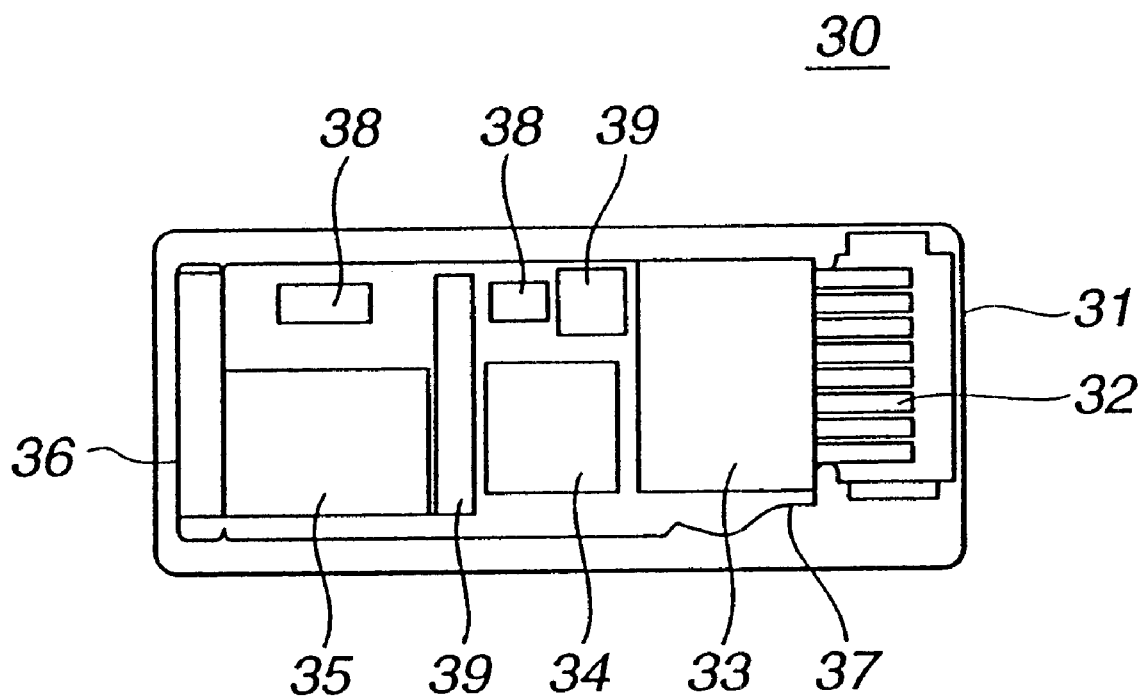
FIG. 10 shows a front view of a subminiature radio communication module.

The antenna device 1 may be mounted to a subminiature radio communication module 30 shown in FIG. 10, whose outside dimension is 50.00 mm×21.45 mm. The subminiature radio communication module 30 has a housing 31 which has built therein various elements for realizing storage function and radio communication function similar to a memory stick (trade name). The housing 31 has a terminal 32, a memory 33 for performing storage function, an LSI 34 for baseband signal processing, and an RF module 35 for high frequency signal processing.

With the subminiature radio communication module 30, an antenna unit 36 is configured by the antenna substrate 8 of the antenna device 1. With the subminiature radio communication module 30, above-described elements including the antenna substrate 8 are mounted to a flexible circuit board 37, and the antenna substrate 8 is so supported by the housing 31 as to uprise therein. The subminiature radio communication module 30 further has a radio wave absorbent 39 for embedding the region among the LSI 34, the RF module 35, other elements 38, and other region. Above described elements are mounted to the flexible circuit board 37 in the housing 31 in order of above description, which can reduce the internal loss of the subminiature radio communication module 30. With the subminiature radio communication module 30, hypofunction due to interference over the antenna unit 36 by the RF module 35 is suppressed.

The subminiature radio communication module 30 is installed to the main apparatus 2 by connecting the terminal 32 thereto. At this time, similar to the radio communication card module 4, the antenna unit 36 uprises at the side of the main apparatus 2 along the side direction thereof. Since the antenna substrate 8 uprises via the flexible circuit board 37, the protruding length from the main apparatus 2 can be minimized.

As in the above, according to the present invention, when the module main body is inserted to the main apparatus and supported therein, the antenna device is supported perpendicular to the insertion direction, and the protruding length of the antenna device is made minimum when in use. So, since the antenna device is not cumbersome, the main apparatus with the radio communication card module can be improved in handling and operating, and is scarcely broken due to a hit by the user. Furthermore, according to the present invention, since the protruding length of the antenna device is reduced, designing conditions of the main apparatus can be loosened significantly, which can realize designing with high degree of freedom. Furthermore, according to the present invention, since the miniaturized antenna device has built therein two antenna patterns and configures polarization diversity, the antenna characteristics is not deteriorated when affected by the housing shape of the main apparatus or material thereof when installed to the main apparatus, which can realize transmission/reception of data or information with high accuracy.

What is claimed is:

1. An antenna device, comprising:
    a first antenna pattern being an inversed F type antenna pattern; and
    a second antenna pattern being a meander type antenna pattern; the first and second antenna patterns being formed on the main surface of a dielectric substrate by printed wiring; wherein there is formed a ground pattern on the dielectric substrate in the vicinity of a feeding portion of the meander type antenna pattern.

2. An antenna device, comprising:
    a first antenna pattern being an inversed F type antenna pattern; and
    a second antenna pattern being a meander type antenna pattern; the first and second antenna patterns being formed on the main surface of a dielectric substrate by printed wiring; wherein the meander type antenna pattern has a point in the vicinity of the opened end thereof connected to a circuit unit formed on the dielectric substrate or to a short circuit forming pattern formed on the dielectric substrate between the inversed F type antenna pattern and the meander type antenna pattern.

3. A radio communication card module which adds radio communication function to a main apparatus, a module main body of the radio communication card module having a radio communication controlling unit and a high frequency signal processing unit built therein, an antenna unit, and a connector unit, the radio communication card module being installed to a slot of the main apparatus and the connector unit being connected to a connector unit of the main apparatus,
    wherein the antenna unit is mounted to a second side located on the opposite side of a first side which has the connector unit, and a dielectric substrate which has at least a first antenna pattern being an inversed F type antenna pattern and a second antenna pattern being a meander type antenna pattern formed on the main surface of the dielectric substrate by printed wiring is supported perpendicular to the insertion direction toward the main apparatus, and
    when the module main body is inserted to the main apparatus and supported therein, the antenna unit protrudes from the side of the main apparatus by a length being the thickness thereof along the side direction of the main apparatus.

4. The radio communication card module as set forth in claim 3, wherein the antenna unit is mounted to an antenna mounting portion formed at the second side of the module main body.

5. The radio communication card module as set forth in claim 4, wherein the antenna mounting portion is a recess capable of housing the antenna unit along the thickness direction thereof which has jack terminals at the bottom portion
    and plug connectors which are electrically connected to a signal terminal pattern and a ground terminal pattern formed on the dielectric substrate and protrude from the dielectric substrate are fit into the jack-terminals so that the antenna unit is removably mounted to the second side of the module main body perpendicular thereto.

6. The radio communication card module as set forth in claim 3, wherein the inversed F type antenna pattern and the meander type antenna pattern are wired so that the directions of the main polarized wave of these antenna patterns cross perpendicular to each other.

7. The radio communication card module as set forth in claim 3, wherein the antenna unit uses the inversed F type antenna pattern and the meander type antenna pattern in the same frequency band.

8. The radio communication card module as set forth in claim 3, wherein the antenna unit uses the inversed F type antenna pattern and the meander type antenna pattern in different frequency bands.

9. The radio communication card module as set forth in claim 3, wherein there is formed a short circuit forming pattern on the dielectric substrate of the antenna unit between the inversed F type antenna pattern and the meander type antenna pattern.

10. The radio communication card module as set forth in claim 3, wherein the inversed F type antenna pattern of the antenna unit has its resonating pattern so formed as to be separated from the ground metal portions of the module main body.

11. The radio communication card module as set forth in claim 3, wherein there is formed a ground pattern on the dielectric substrate of the antenna unit in the vicinity of a feeding portion of the meander type antenna pattern.

12. The radio communication card module as set forth in claim 3, wherein the meander type antenna pattern of the antenna unit has a point in the vicinity of the opened end thereof connected to a circuit unit formed on the dielectric substrate or to a short circuit forming pattern formed on the dielectric substrate between the inversed F type antenna pattern and the meander type antenna pattern.

13. The radio communication card module as set forth in claim 3, wherein the meander type antenna pattern of the antenna unit is formed so that the feeding end thereof is located in the vicinity of the ground metal portions of the module main body and the opened end thereof is separated from the ground metal portions of the module main body.

14. The radio communication card module as set forth in claim 3, wherein the dielectric substrate of the antenna unit is an epoxy resin substrate of flame retardant grade 4, a ceramic substrate, or a polytetrafluoroethylene-ceramic combined substrate.

\* \* \* \* \*